(12) United States Patent
Huang et al.

(10) Patent No.: US 9,454,540 B2
(45) Date of Patent: Sep. 27, 2016

(54) SYSTEMS AND METHODS FOR SHARING FILES AMONG MULTIPLE TERMINALS

(71) Applicant: Tencent Technology (Shenzhen) Company Limited, Shenzhen (CN)

(72) Inventors: Jian Hua Huang, Shenzhen (CN); Tian Chen, Shenzhen (CN); Qian Jiang, Shenzhen (CN); Xiao Xiao, Shenzhen (CN); Xing Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 90 days.

(21) Appl. No.: 14/085,684

(22) Filed: Nov. 20, 2013

(65) Prior Publication Data

US 2014/0089662 A1 Mar. 27, 2014

(30) Foreign Application Priority Data

Sep. 26, 2012 (CN) .......................... 2012 1 0361197

(51) Int. Cl.
| | | |
|---|---|---|
| *G06F 21/00* | (2013.01) | |
| *G06F 17/30* | (2006.01) | |
| *G06F 21/60* | (2013.01) | |
| *G06F 21/62* | (2013.01) | |

(52) U.S. Cl.
CPC ... *G06F 17/30174* (2013.01); *G06F 17/30887* (2013.01); *G06F 21/602* (2013.01); *G06F 21/6209* (2013.01)

(58) Field of Classification Search
CPC ............. G06F 21/6209; G06F 17/602; G06F 17/30174; G06F 17/30887; G06F 21/31; G06F 21/6218; G06F 2221/2107; H04N 21/2407
See application file for complete search history.

(56) References Cited

U.S. PATENT DOCUMENTS

| | | | |
|---|---|---|---|
| 2007/0157263 A1* | 7/2007 | Horii et al. ..................... | 725/87 |
| 2008/0109852 A1* | 5/2008 | Kretz et al. ..................... | 725/62 |
| 2008/0178252 A1* | 7/2008 | Michaud ........................ | 726/1 |
| 2010/0223467 A1* | 9/2010 | Dismore et al. .............. | 713/168 |

FOREIGN PATENT DOCUMENTS

| | | |
|---|---|---|
| CN | 101102211 | 1/2008 |
| CN | 101529867 | 9/2009 |
| CN | 102035869 | 4/2011 |

OTHER PUBLICATIONS

International Search Report and Written Opinion mailed Sep. 26, 2013, directed to PCT/CN2013/077356; 11 pages.
Patent Examination Report No. 1 dated Jul. 13, 2015, directed towards AU Application No. 2013325007; 2 pages.
First Office Action mailed Oct. 8, 2014, directed towards CN Application No. 201210361197.2 with concise explanation of relevancy; 7 pages.
Office Action dated Nov. 16, 2015, directed towards counterpart Canadian Application No. 2864923; 5 pages.

* cited by examiner

*Primary Examiner* — Michael S McNally
*Assistant Examiner* — Carlton Johnson
(74) *Attorney, Agent, or Firm* — Anova Law Group, PLLC (57) ABSTRACT

Embodiments of the disclosure provide a method and apparatus for sharing data. The method includes: initiating the data sharing application on a first terminal; inserting the file to be shared in a webpage of the data sharing application on the first terminal, and generating an URL for the file in the data sharing application; the data-sharing application of the first terminal broadcasts the URL to other terminal, so that other terminals can share the file via the URL. The present disclosure can reduce the cost of data sharing while improve on the real-timeliness.

18 Claims, 6 Drawing Sheets

FIG. 9 ional Application No. PCT/CN2013/077356 filed on Jun. 18, 2013, which claims the priority benefit of Chinese Patent Application No. 201210361197.2, filed on Sep. 26, 2012, the content of both the PCT application and the Chinese application is incorporated by reference herein in its entirety for all purposes.

SYSTEMS AND METHODS FOR SHARING FILES AMONG MULTIPLE TERMINALS

CROSS REFERENCE TO RELATED APPLICATIONS

This application is a U.S. continuation application under 35 U.S.C. §111(a) claiming priority, under 35 U.S.C. §120 and 365(c), to International Application No. PCT/CN2013/077356 filed on Jun. 18, 2013, which claims the priority benefit of Chinese Patent Application No. 201210361197.2, filed on Sep. 26, 2012, the content of both the PCT application and the Chinese application is incorporated by reference herein in its entirety for all purposes.

FIELD

The present disclosure generally relates to Internet-related technologies, and more particularly, to a method and apparatus for sharing information.

BACKGROUND

With existing technology, there are two ways for sharing a file on a local terminal for browsing by other terminals.

One method is to use a data cable in conjunction with a data synchronizing application. In particular, the files on each terminal are synchronized onto a personal computer (PC) installed with the data-synchronizing application. Other terminals can then copy the file from the PC.

The other method is to use a server with a data synchronizing application. When performing server-assisted file sharing, the following can be performed: one of the terminals (e.g., terminal 1) transmits a file to the server, the server then notifies the other terminals (e.g., terminals 2-5), as illustrated in FIG. 1.

Figure 1:
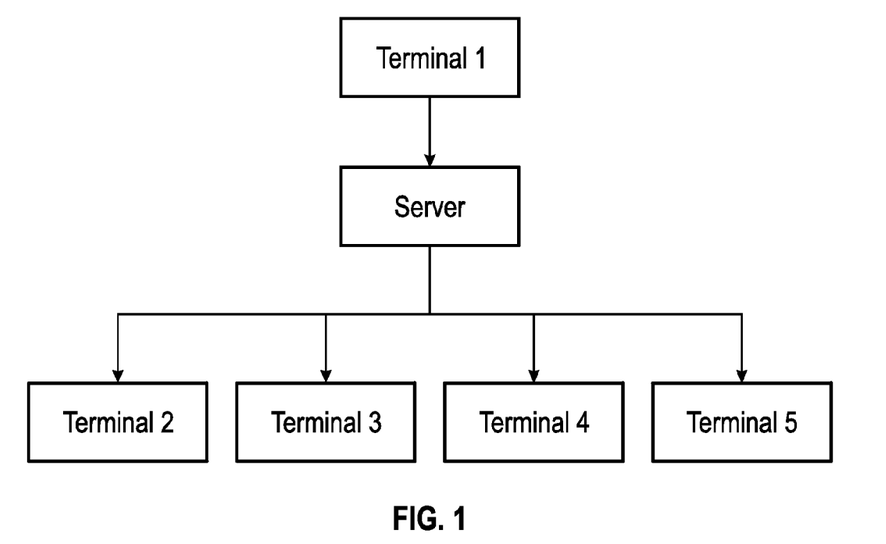
FIG. 1 is a block diagram illustrating the exemplary network of terminals capable of sharing data with each other using existing methods.

The file-sharing method illustrated in FIG. 1 can be relatively stable in achieving data sharing among the terminals. But because it requires going through the server, the data sharing cannot be guaranteed to take place in real-time. In addition, this method also requires support of the server. Thus, a user would not be able to use this method without Internet connection. This reliance on network connectivity can make this data-sharing method relatively costly to implement.

SUMMARY

One of the technical problems to be resolved by the embodiments of this disclosure is to provide a method and apparatus for sharing information with reduced cost and improved real-timeliness.

To resolve the above-described technical problem, embodiments of the disclosure provide a data-sharing method including: starting a data-sharing application on a first terminal; placing a file to be shared on a page of the data-sharing application on the first terminal and generating a link address of the file in the data-sharing application; the data-sharing application on the first terminal broadcasting the link address to at least one other terminal to allow the at least one other terminal to access the shared file.

In another aspect, the present disclosure also provides an information-sharing apparatus, for use on a terminal, the apparatus can include: a starting module that starts the data-sharing application on the terminal; an address-generating module that places the shared file on a page of the data-sharing application and generating a link address for the shared file in the data-sharing application on the terminal; an address-broadcasting module that broadcasts the link address to at least one other terminal to allow the at least one other terminal to access the shared file.

In addition, the present disclosure also provides a terminal device including the above-described information-sharing apparatus.

The embodiments of the present disclosure can provide the following advantages: in the embodiments, when a file is to be shared, the terminal storing the file can broadcast a link address. The other terminal(s) can access (e.g., download or browse) the shared file via the link address. This can eliminate the requirement of a dedicated server, thereby reducing cost and improve on real-timeliness of the process.

DETAILED DESCRIPTION

A detailed description of the technical solutions of the embodiments of the present disclosure is provided below in view of the accompanying drawings. It should be understood that the embodiments described below are representative embodiments of the present disclosure rather than a complete disclosure of the every possible embodiment. The present disclosure can also include any other embodiments that can be derived from these disclosed embodiments by a person with ordinary skill in the art without any additional inventive work. It is to be understood that other embodiments can be used and structural changes can be made without departing from the scope of the embodiments of this disclosure.

This disclosure generally relates to systems and methods for sharing data such as a file on one terminal with at least one other terminal. Instead of requiring a wired connection between two devices to transmit data such as, for example, using a universal serial bus (USB) to transfer songs from a Mac to an iPhone, embodiments of the disclosure can allow terminals (e.g., end user devices) to share data via a wireless network. Furthermore, no dedicated server is required to route the shared data among the multiple terminals. This is thus different from, for example, a cloud server synchronizing data on multiple devices. Essentially, the terminal on which data is to be shared (i.e., data-sharing terminal) can create its own data-sharing service using a common application protocol, such as Hypertext Transfer Protocol (HTTP), to provide a link address (e.g., an URL) for the shared data. The link address can direct at least one other terminal to locate and retrieve the shared data. This can provide a quick and easy mechanism for devices on the same network to share data with one another in a wireless fashion without using a central server.

As referred herein, a terminal including, for example, a file-sharing terminal or a file-receiving terminal can be any network-enabled electronic devices including, but not limited to, PCs, Macs, desktop computers, laptop computers, tablet PCs, smartphones including iPhones, Android phones, Windows phones, and Blackberries, e-readers, in-car communication devices, televisions and other consumer electronic devices capable of connecting to a wireless network. A terminal offering its data for sharing can be referred to as a file-sharing terminal, data-sharing terminal, or information-sharing terminal, all of which are used interchangeably in this document. A terminal receiving data shared by a file-sharing terminal can be referred to as a file-receiving terminal, data-receiving terminal, or information-receiving terminal, all of which are used interchangeably in this document.

A file-sharing (or data-sharing) terminal can include a web server, such as an HTTP server, for hosting data for sharing with at least one other terminal on the network. Although the embodiments below use HTTP and HTTP server as an exemplary protocol and web server, respectively, on the file-sharing terminal, it should be understood that other suitable protocols, such as universal plug and play (UPnP) and corresponding servers can also be used on the file-sharing terminal without departing from the spirit of the disclosure. The file-sharing terminal can also include a program for broadcasting link addresses to other terminals on the network. In some embodiment, the broadcasting program can broadcast link addresses and other information to terminals within a certain range. In other embodiments, the broadcasting program can detect the identification (e.g., IP address) of at least one other terminal on the network and selectively send link addresses to some or all of the identified terminals. In some embodiments, only a certain number (e.g., the first ten) of data-sharing terminals can access a page on the file-sharing terminal at any time. Other terminals can be granted access after one or more of the browsing sessions from another terminal have ended.

A file-receiving (or data-receiving) terminal can include a web browser, such as Internet Explorer (IE), Chrome, Safari, or other software for requesting and displaying a page, such as a web page, designated by a link address, such as an URL. The browser or other browsing software can include plug-in software for displaying, for example, audio, video, animation, Flash, PDF, and other types of data. In some embodiment, the browser or browsing software can initiate another external program to display part of all of the contents on a page. In some embodiments, the browser or browsing software can detect the type of data on a page and automatically initiate the corresponding program (e.g., plug-in or external) for displaying the data on the file-receiving terminal. The file-receiving terminal can include a program for receiving alerts or other types of messages from one or more file-sharing terminals. The alerts or messages can include link addresses for accessing data on the file-sharing terminals. In some embodiments, the program can be active in the background at all time. In other embodiments, it can be manually activated. In some embodiments, the alerts or messages can be receiving using existing message applications on the terminal. The file-receiving terminal can accept alerts/messages from any data-sharing terminals on the same network. Alternatively, the file-receiving terminal can be programmed to only receive alerts and messages from selective file-receiving terminals.

A terminal can be both a file-sharing terminal and a file-receiving terminal. For example, it can both share data by putting the data on a page of the local HTTP server and sending the URL of the page to other terminals and receive alerts from other terminals and access data on the other terminals using URLs in the received alerts. Accordingly, any terminal on the network can share data with any other terminals on the same network. Data being shared among the terminals can include, but is not limited to, text, image, audio, video, and other types of multimedia data.

Detailed embodiments of the disclosure are provided in the following paragraphs.

To resolve the cost and real-timeliness issues relating to data-sharing, embodiments of the disclosure utilize a data-sharing application initiated by a terminal sharing its data to reduce cost and improve real-timeliness of the data-sharing process. Using the disclosed methods and apparatus, a user can still share data when only having access to a local area network (LAN).

In the embodiments of the disclosure, when a data-sharing terminal needs to share a file with at least one other terminal, the data-sharing terminal can first open a data-sharing application, place the file to be shared on a designated page of the data-sharing application, and then broadcast the URL of the page. A browsing terminal can visit the page and the file on the page directly through the URL. If the data-sharing terminal modifies the content of the file, the modifications can be reflected on the browsing terminal in real time. Because a server is no longer needed and the method can be implemented over a LAN, data can be shared much more quickly among the terminals.

Figure 2:
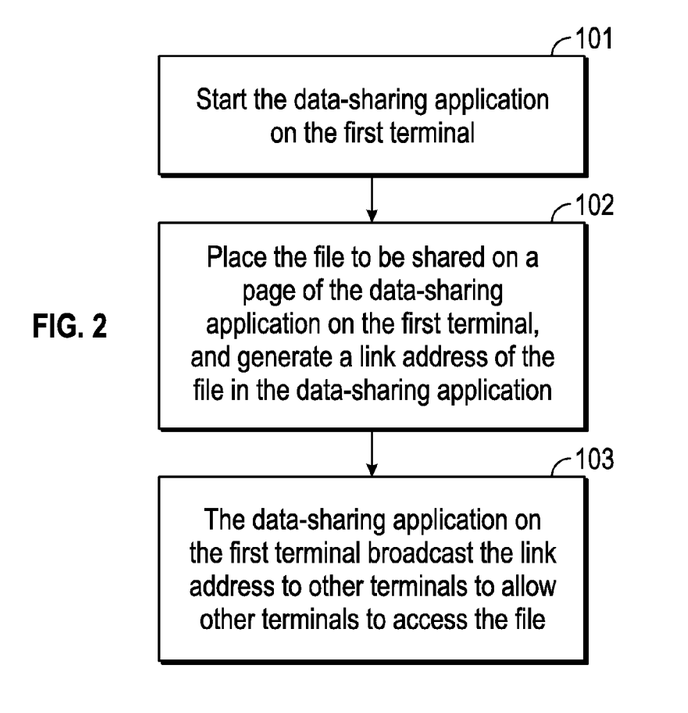
FIG. 2 is a flow chart illustrating the exemplary steps of a method for sharing information according to an embodiment of the disclosure.

FIG. 2 is a flow chart illustrating the exemplary steps of a method for sharing information according to an embodiment of the disclosure. The flow chart includes the following steps.

101: Starting a data-sharing application on a first terminal. The first terminal can be a PC or any other terminals, such as a smartphone, tablet PC, etc., that are capable of sharing data. In particular, the data-sharing application can be the services provided by an HTTP Server on the first terminal, such as a Web Server in a Windows system. This may only require setting the service setting of the HTTP Server to "Enabled." It should be understood that a data-sharing application with the same functions can be set up on a terminal not equipped with an HTTP Server.

102: Placing the file to be shared on the first terminal on a page of the data-sharing application and generating a link address for the file in the data-sharing application. In particular, the link address can be an address for browsing the file on the first terminal. For example, the link address can be an URL of the file in the service of the HTTP Server of the first terminal.

103: The data-sharing application of the first terminal broadcasting the link address to at least one other terminal to allow the at least one other terminal to access the file via the link address. In particular, after the first terminal broadcasts the link address, the at least one other terminal can obtain the link address by using specific technology, such as, for example, using the Banjo App to receive messages broadcast from other terminals in its vicinity.

In addition, the at least one other terminal can be notified when the file is modified. This can include the following additional steps: the data-sharing application on the first terminal obtaining modification information regarding the file, the data-sharing application on the first terminal broadcasting an alert to the at least one other terminal with which the file has been shared, the alert for alerting the at least one other terminal that the file has been modified.

It should be understood that, if the at least one other terminal is only browsing the file, when the file is modified on the first terminal, the modified file can just be displayed in real time on the at least one other terminal. When the at least one other terminal is downloading the file, the first terminal can notify the at least one other terminal via an alert that the file has been modified. When the at least one other terminals receives the alert, its user can select to download the file again, or simply browsing the modified file.

The file can include, for example, a video file or an image file. The data-sharing application of the first terminal can also generate a preview page of the video or image file in response to a request from the at least one other terminal. The resolution of the preview page can be lower than that of the original file. It should be understood that the file can be of any other types of file. For example, the first terminal can also generate a preview page of the content of the file when the file is a text file. In that case, the resolution may not need to be reduced.

When the file is an executable that is not suitable for previewing, a preview is typically not provided. The page may only prompt the user to download the file.

When the at least one other terminal obtains the link address, the method can further include: the other terminal visiting the page via the link address and browsing the file on the page. In particular, the other terminal can open the page corresponding to the link address in any of the currently-available browsers.

Figure 3:
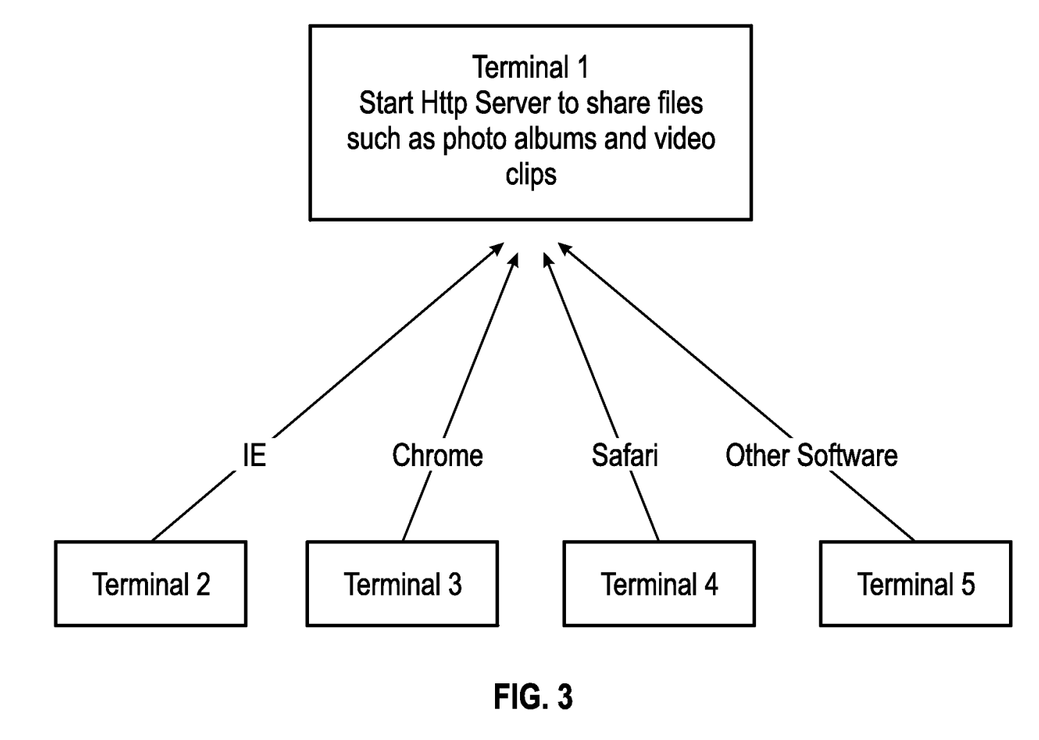
FIG. 3 is a block diagram illustrating multiple terminals using different browsers to access a shared file on a data-sharing terminal, according to an embodiment of the disclosure.

FIG. 3 is a block diagram illustrating multiple terminals using different browsers to access a shared file on terminal 1, according to an embodiment of the disclosure. In this embodiment, Internet Explorer (IE), Chrome, and Safari are the exemplary browsers. The data-sharing application on terminal 1 can be the services of an HTTP Server. When terminal 1 needs to share a file (e.g., a photo album, video clip, etc.) with other terminals, it can first turn on the services of the local HTTP Server and place the file to be shared on a designated page of the HTTP server. Then, an URL of the page can be broadcast. A browser can access the file directly via the URL. If the content of the file on terminal 1 is modified, a browser visiting the page can browse the modified content in real time.

For example, various applications, such as photo albums or collections of video clips, can be developed on the HTTP Server. Selecting a local file from one or more of these local applications can place the file on a designated page on the HTTP Server.

Figure 4:
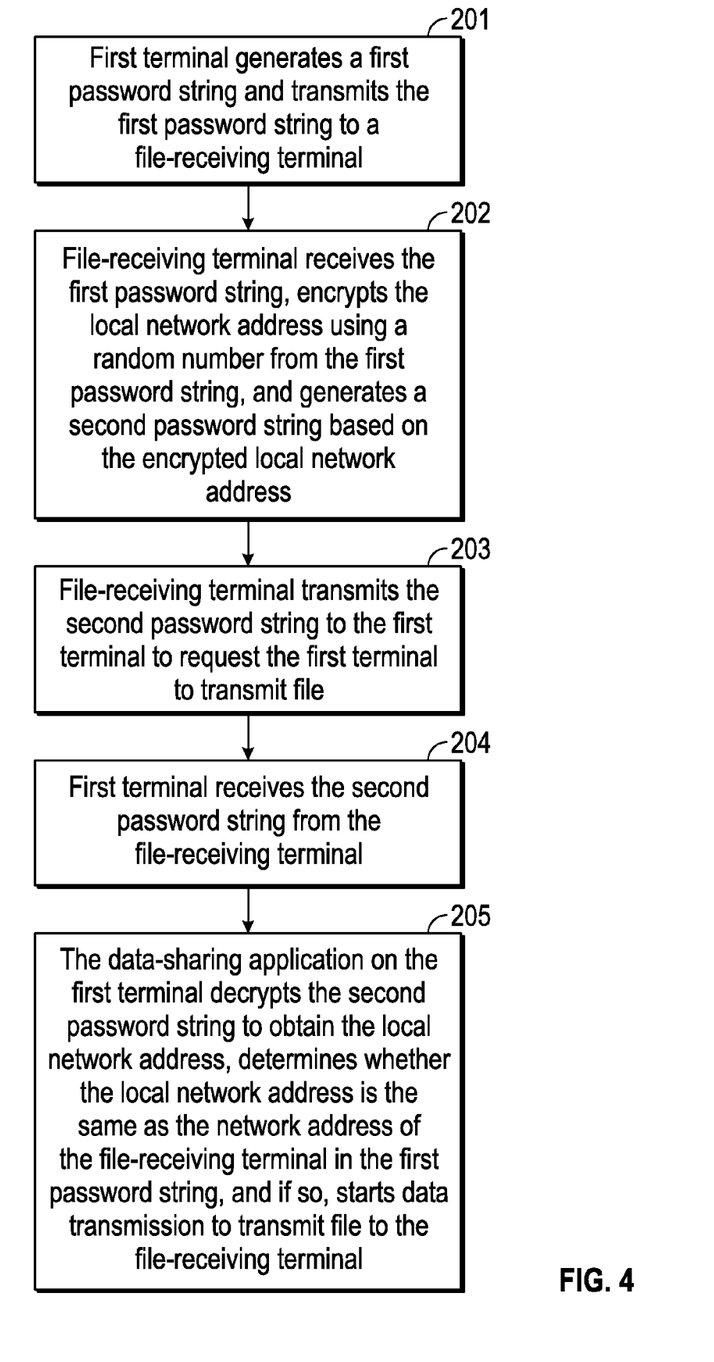
FIG. 4 is a flow chart illustrating the exemplary steps of a data-sharing process, according to an embodiment of the disclosure.

In the meantime, the data-sharing application in this embodiment can also transmit file in addition to sharing data as described above. As illustrated in FIG. 4, the method can also include the following steps.

201: the data-sharing application of the first terminal can generate a first password string and send the first password string to at least one file-receiving terminal. The first password string can include a random number, encrypted network address of the file-receiving terminal, and encrypted link address of the file.

In particular, the network address of the file-receiving terminal can be, for example, the Internet Protocol (IP) address associated with the data-receiving terminal.

In particular, generating the first password string can include: the data-sharing application on the first terminal encrypting the network address of the file-receiving terminal by using the random number; encrypting the link address of the file and the encrypted network address of the file-receiving terminal to obtain encrypted network address of the file-receiving terminal and link address of the file; and incorporating the random number into the encrypted network address of the file-receiving terminal and link address of the file.

202: The file-receiving terminal receiving the first password string, and encrypting the local network address using the random number in the first password string, and generating a second password string based on the encrypted local network address and the first password string.

203: The file-receiving terminal transmitting the second password string to the first terminal to request the first terminal to transmit the file.

204: The first terminal receiving the second password string from the file-receiving terminal. In this step, when the first terminal receives the second password string from the file-receiving terminal, if the data-sharing application has not started, the first terminal can restart the data-sharing application so that the data-sharing application can perform authentication and file transmission. It should be understood that the triggering condition for restarting the data-sharing application can be in the next step. That is, when the first terminal receives the second password string from the file-receiving terminal and successfully performs the authentication process, if the data-sharing application has not started, the first terminal can restart the data-sharing application to transmit files.

205: The data-sharing application of the first terminal decrypting to obtain the local network address from the second password string, and determining whether the local network address in the second password string is the same as the network address of the file-receiving terminal in the first password string. If they are the same, file transmission can be started to transmit the file to the file-receiving terminal. Otherwise, no file transmission is to take place.

In particular, when transmitting files, if the file-receiving terminal does not wish to receive the file right away, or if the file-receiving process is interrupted, the file-receiving terminal can transmit the second password string to the first terminal again to request that the file be transmitted or that the interrupted transmission be renewed. If the data-sharing application on the first terminal is already closed, the first terminal can restart the data-sharing application to complete the file transmission if authentication is successful.

As such, in the embodiments of the disclosure, the file-receiving terminal can request file transmission by transmitting the second password string. Because the second password string can include the link address of the file, the link address can be used multiple times. Thus, there is no need for the terminal transmitting the file to store information, thereby reducing the tediousness of exchanging information between the terminals. After successfully authenticating again, the remaining portion of the file starting from the interruption point can be transmitted to complete the transmission.

FIG. 4 illustrates one example of an encryption and decryption process for providing secured transmission of network addresses, link address, and/or possibly other information between two terminals. It should be understood that other types of suitable encryption/decryption mechanisms, such as public/private key encryption, can also be enhance the security of the data transmission between two or more terminals.

Figure 5:
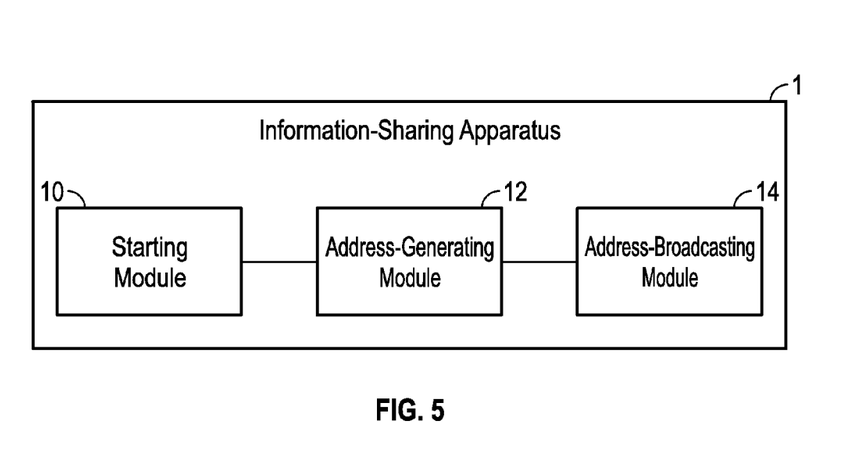
FIG. 5 is a detailed structure diagram of an exemplary information sharing apparatus, according to an embodiment of the disclosure.

FIG. 5 is a detailed structure diagram of an exemplary information sharing apparatus, according to embodiments of the disclosure. The apparatus can be a part of a terminal. The apparatus 1 can include a starting module 10 for starting the data-sharing application on the terminal; an address-generating module 12 for placing the file to be shared from the terminal on a page in the data-sharing application, and generating a link address of the file in the data-sharing application of the terminal; and an address-broadcasting module 14 for broadcasting the link address to at least one other terminal, thereby allowing the at least one other terminal to access the shared file. Not shown in FIG. 5 can be other modules including, but not limited to, an HTTP Server for providing one or more pages containing data to be shared with other terminals over a wireless network.

For example, the data-sharing application can be the services of an HTTP Server of the first terminal, such that the staring module 10 can also be used for enabling the services of the HTTP Server on the terminal. Accordingly, the link address of the data-sharing application on the first terminal can be an URL of the file in the service of the HTTP Server of the first terminal.

Figure 6:
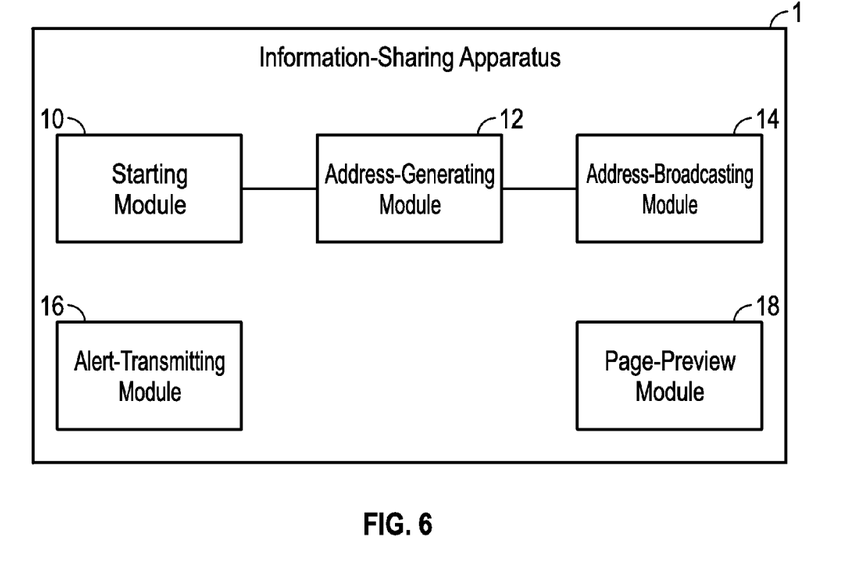
FIG. 6 is a detailed structure diagram of another exemplary information sharing apparatus, according to an embodiment of the disclosure.

As illustrated in FIG. 6, the apparatus 1 can also include an alert transmitting module 16 for obtaining modification information of the file and sending an alert, based on the modification information, to at least one other terminal with which the file has been shared. The alert can alert the receiving terminal that the file has been modified. When the file includes a video file or image file, the apparatus 1 can also include a page-preview module 18 for generating a preview page for the video file or image file based on a request from another terminal. FIG. 6 illustrates an example in which both modules are included in the apparatus. It should be understood that, in other embodiments of the disclosure, only one of the two modules can be included.

Figure 7:
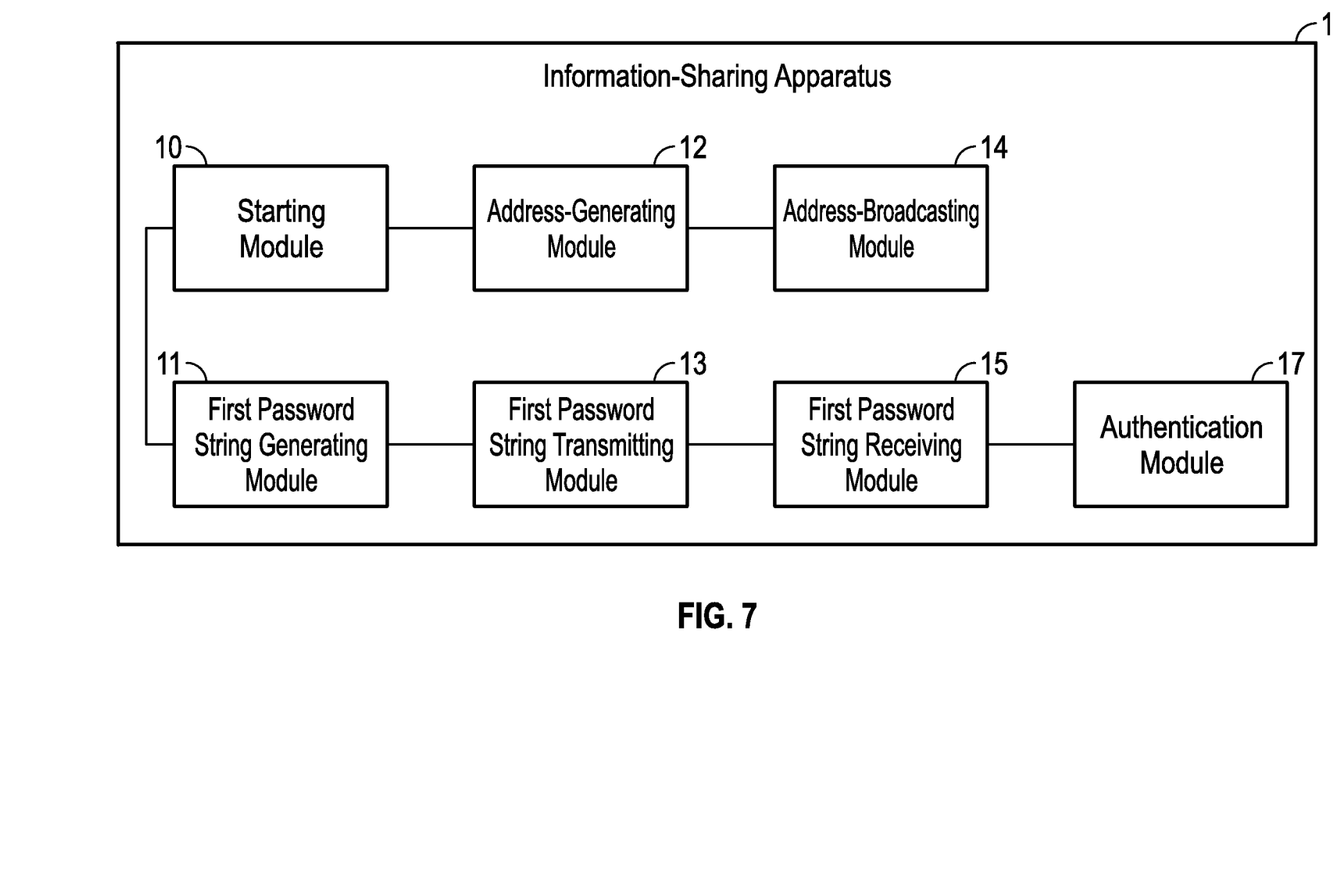
FIG. 7 is a detailed structure diagram of yet another exemplary information sharing apparatus, according to an embodiment of the disclosure.

As illustrated in FIG. 7, the apparatus 1 can also include a first password generating module 11 for generating a first password string, the first password string including a random number and the encrypted network address of a file-receiving terminal and encrypted link address of a file to be shared; a first password transmitting module 13 for transmitting a first password string to the file-receiving terminal; a second password receiving module 15 for receiving a second password string returned from the file-receiving terminal, the second password string including the first password string and the local network address of the file-receiving terminal encrypted based on the random number from the first password string; an authentication module 17 for decrypting the second password string to obtain the local network address from the second password string and determining whether the local network address obtained from the second password string and the network address of the file-receiving terminal in the first password string are the same, and if they are the same, starting file transmission to transmit the file to the file-receiving terminal.

For example, after the second password receiving module 15 receives the second password string from the file-receiving terminal, if the data-sharing application has yet to be started, the starting module 10 can restart the data-sharing application to allow the authentication module 17 to perform authentication and file transmission. It should be understood that the starting module 10 can also restart the data-sharing application after the authenticate module finishes the authentication process.

Figure 8:
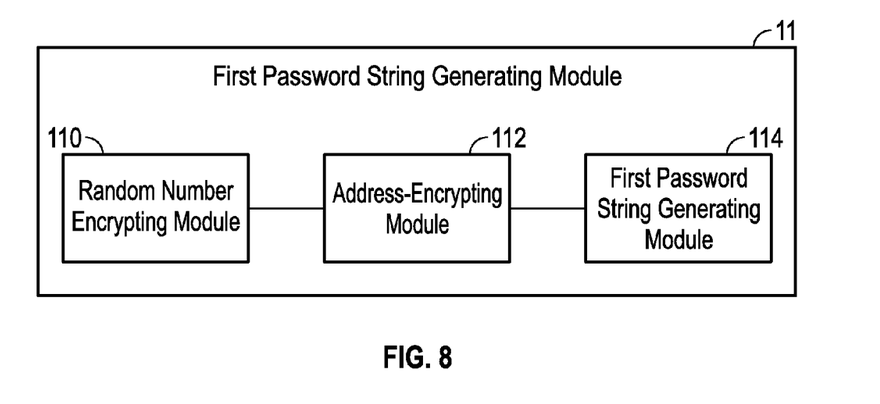
FIG. 8 is a detailed structure diagram of an exemplary first password string generating module, according to an embodiment of the disclosure.

As illustrated in FIG. 8, the first password generating module 11 can include: a random number encrypting module 110 for encrypting the network address of the file-receiving terminal using a random number; an address-encrypting module 112 for encrypting the link address of a file and the encrypted network address of the file-receiving terminal to obtain encrypted network address of the file-receiving terminal and link address of the file; a first password generating unit 114 for incorporating the random number into the encrypted network address of the file-receiving terminal and the link address of the file to obtain the first password string.

The embodiments of the disclosure also disclose a terminal including the above-described information-sharing apparatus. It should be noted that the terminal can be a PC or a mobile terminal, such as a smartphone or a tablet PC, etc.

In the embodiments of the disclosure, when a file is to be shared, the terminal storing the file locally can broadcast a link address. At least one other terminal can access this file using this link address. For example, the at least one other terminal can download or browse the file. This can eliminate the need of a server, thereby reducing cost while improving the real-timeliness of the file-sharing process.

In another aspect, when a file is to be transmitted, the file-receiving terminal can request file transmission by transmitting a second password. Because the second password can include the link address of the file, the link address can be used multiple times. There is no need for the file-transmitting terminal to store information, thereby reducing the tediousness of exchanging information between the terminals. At the same time, the second password string can also include the local network address to allow the receiving terminal to authenticate, thereby improving the security of the file transmission. After successfully authenticating again, the remaining part of the file can be transmitted starting from the interruption point to complete the transmission.

Based on the above-described embodiments, a person skilled in the art can understand that parts of or the whole process described in each of the above embodiments can be performed by hardware in accordance with instructions from one or more computer programs. The one or more computer programs can be stored in a non-transitory readable medium, and when executed, perform the processes described in these embodiments. The non-transitory computer readable medium can be a floppy disk, CD, read-only memory (ROM), or random access memory (RAM).

In some embodiments, one or more of the modules in FIGS. 5-8 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this file, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 9:
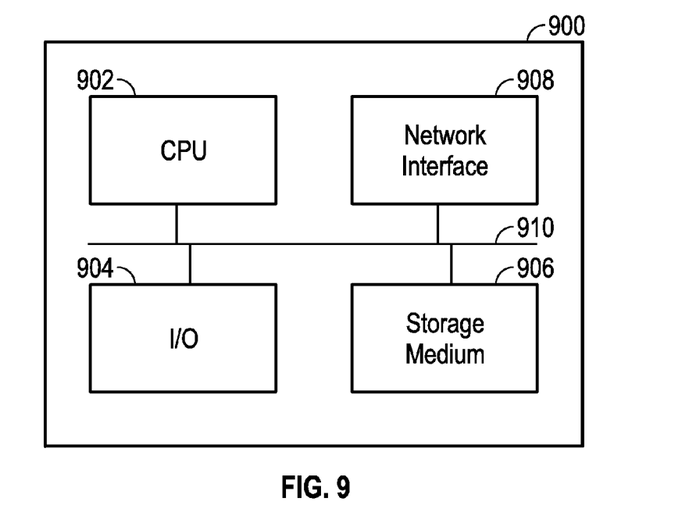
FIG. 9 illustrates exemplary common hardware components of a terminal, according to an embodiment of the disclosure.

The non-transitory computer readable storage medium can be part of a computing system serving as the server or the cloud-connection device. FIG. 9 illustrates exemplary common components of one such computing system. As illustrated, the system 900 can include a central processing unit (CPU) 902, I/O components 904 including, but not limited to one or more of display, keypad, touch screen, speaker, and microphone, storage medium 906 such as the ones listed in the last paragraph, and network interface 908, all of which can be connected to each other via a system bus 910. The storage medium 906 can include the modules of FIGS. 5-8 depending on whether the system is a server or a cloud-connecting device.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A data-sharing method comprising:
   starting data-sharing application on a first terminal,
   placing a file to be shared from the first terminal in a webpage of the data-sharing application and generating a link address for the file in the data-sharing application,
   broadcasting, by the data-sharing application on the first terminal, the link to at least one other terminal so that the at least one other terminal can share the file via the link address,
   the data-sharing application on the first terminal generating a first password string, transmitting the first password string to a file-receiving terminal, the first password string including a random number, an encrypted network address of the file-receiving terminal, and an encrypted link address of the file,
   the file-receiving terminal receiving the first password string, encrypting a local network address of the file-receiving terminal using the random number in the first password string, and generating a second password string comprising: the encrypted local network address generated by the file-receiving terminal, and the link address of the file from the first password string,
   the file receiving terminal transmitting, to the first terminal, the second password string to request the first terminal to transmit the file,
   the first terminal receiving the second password string returned from the file-receiving terminal,
   the data-sharing application of the first terminal decrypting to obtain the local network address from the second password string, determining whether the local network address in the second password string is the same as the network address of the file-receiving terminal in the first password string, if they are determined to be the same, start transmitting the file to the file-receiving terminal, and
   when the file-receiving terminal does not receive the file right away, or when a file-transmitting process is interrupted between the first terminal and the file-receiving terminal,
   the file-receiving terminal transmitting the second password string to the first terminal again to request that the file be transmitted or that the interrupted transmission be renewed, and
   the first terminal directly sending the file to the file-receiving terminal if the local network address in the second password string is determined to be the same as the network address of the file-receiving terminal in the first password string, without conducting a specific communication to request and determine the file after the second password string is transmitted.

2. The method of claim 1,
   wherein the data-sharing application comprises a service of an HTTP Server on the first terminal, and
   wherein the link address of the file in the data-sharing application of the first terminal comprises a uniform resource locator (URL) of the file in the service of the HTTP Server of the first terminal.

3. The method of claim 1, comprising:
   the data-sharing application on the first terminal obtaining modifying information regarding the file, and
   the data-sharing application on the first terminal broadcasting alert regarding the file to at least one other terminal with which the file is shared, the alert for prompting that the file has been modified.

4. The method of one of claim 1,
   wherein the file comprises a video file or an image file, and
   wherein the first terminal also generates a preview page for the video file or the image file in response to a request from the at least one other terminal.

5. The method of one of claim 1, comprising: the at least one other terminal visiting the page linked by the link address, browsing the file on the page.

6. The method of claim 1, wherein the data-sharing application of the first terminal generating the first password string comprises:
   the data-sharing application of the first terminal encrypting the network address of the file-receiving terminal using the random number to obtain a first-layer encrypted data,
   encrypting the link address of the file and the first-layer encrypted data which is the encrypted network address of the file-receiving terminal to obtain encrypted network address of the file-receiving terminal and the link address of the file as a second-layer encrypted data, and
   incorporating the random number to the second-layer encrypted data which is the encrypted network address of the file-receiving terminal and the link address of the file, to obtain a third-layer encrypted data as the first password string.

7. The method of claim 1, wherein, after the first terminal receives the second password string returned from the file-receiving terminal, if the data-sharing application has not started, restarting the data-sharing application so that the data-sharing application can authenticate and file transmission process.

8. An information sharing apparatus used in a terminal device, the apparatus including:
   a starting module that starts the data sharing application on the terminal,
   an address-generating module that places a file to be shared from the first terminal in a webpage of the data-sharing application and generating a link address for the file in the data-sharing application, an address-broadcasting module that broadcasts the link to at least one other terminal so that the at least one other terminal can share the file via the link address, a first password generating module that generates a first password string including a random number, an encrypted network address of the file-receiving terminal, and an encrypted link address of the file, a first password transmitting module that transmits the first password string to a file-receiving terminal, a second password receiving module that receives a second password string returned from the file-receiving terminal, the second password string generated based on the first password string received by the file-receiving terminal, the second password string including: the first password string including the encrypted link address of the file, and a local network address of the file-receiving terminal encrypted using the random number in the first password string and generated by the file-receiving terminal, and an authentication module that decrypts the second password string to obtain the local network address, and determines whether the location network address obtained from the second password string is the same as the network address of the file-receiving terminal in the first password string, and if they are the same, starts file transmission to transmit the file to the file-receiving terminal, wherein when the file-receiving terminal does not receive the file right away, or when a file-transmitting process is interrupted between the information sharing apparatus and the file-receiving terminal, the file-receiving terminal transmits the second password string to the first terminal again to request that the file be transmitted or that the interrupted transmission be renewed, and the first terminal directly sends the file to the file-receiving terminal if the local network address in the second password string is determined to be the same as the network address of the file-receiving terminal in the first password string, without conducting a specific communication to request and determine the file after the second password string is transmitted.

9. The apparatus of claim 8,
wherein the data-sharing application comprises a service of an HTTP Server on the first terminal and the starting module is configured to start a service on the HTTP Server, and
wherein the link address of the file in the data-sharing application of the first terminal comprises an URL of the file in the service of the HTTP Server of the first terminal.

10. The apparatus of claim 8, comprising:
an alert transmitting module that obtains modification information for the file, transmits alert information, based on the modification information, to at least one other terminal with which the file has been shared, the alert information for alerting that the file has been modified.

11. The apparatus of claim 8, wherein the file comprises a video file or an image file, the apparatus comprising:
a page-preview module that generates a preview page of the video file or image file based on a request by at least one other terminal.

12. The apparatus of claim 8, wherein the first password generating module comprises:

a random number encrypting unit that encrypts the network address of the file-receiving terminal using the random number to obtain a first-layer encrypted data, an address encrypting unit that encrypts the link address of the file and the first-layer encrypted data which is the encrypted network address of the file-receiving terminal to obtain encrypted network address of the file-receiving terminal and the link address of the file as a second-layer encrypted data, and a first password string generating unit that incorporates the random number and the second-layer encrypted data which is the encrypted network address of the file-receiving terminal and the link address of the file, to obtain a third-layer encrypted data as the first password string.

13. The apparatus of claim 8, wherein, after the second password receiving module receives the second password string from the file-receiving terminal, if the data-sharing application has started, the starting module restarts the data-sharing application to have the authentication module to perform authentication and file transmission.

14. A data-receiving terminal comprising:
an alert-receiving module that receives an alert from a data-sharing terminal, the alert comprising a link address for a file shared by the data-sharing terminal,
a first password string receiving module that receives a first password string from the data-sharing terminal, the first password string comprising a random number, an encrypted network address of the data-receiving terminal, and an encrypted link address of the file,
a second password string generating module that generates a second password string based on the first password string, the second password string comprising: the link address of the file from the first password string and a local network address of the data-receiving terminal encrypted using the random number in the first password string, and
a browsing module that accesses the file using the link address;
wherein when the file-receiving terminal does not receive the file right away, or when a file-transmitting process is interrupted between the information sharing apparatus and the file-receiving terminal,
the file-receiving terminal transmits the second password string to the first terminal again to request that the file be transmitted or that the interrupted transmission be renewed, and
the first terminal directly sends the file to the file-receiving terminal if the local network address in the second password string is determined to be the same as the network address of the file-receiving terminal in the first password string, without conducting a specific communication to request and determine the file after the second password string is transmitted.

15. The data-receiving terminal of claim 14, comprising:
a previewing module that requests a preview of the file.

16. The data-receiving terminal of claim 14, comprising:
a plug-in module that detects a data type of data in the file and starts a plug-in program for viewing the data of the detected data type.

17. The data-receiving terminal of claim 14, comprising:
a modification notification receiving module that receives a message from the data-sharing module, the message indicating that the file has been modified.

18. The data-receiving terminal of claim 17, comprising:
a page-reloading module that obtains a modified page in response to the message received by the modification notification receiving module.

* * * * *